United States Patent [19]
Fisher

[11] Patent Number: 5,761,503
[45] Date of Patent: Jun. 2, 1998

US005761503A

[54] AUTOMATED VOLSER RANGE MANAGEMENT FOR REMOVABLE MEDIA STORAGE LIBRARY

[75] Inventor: James Arthur Fisher, Tucson, Ariz.

[73] Assignee: International Business Machines Corporation, Armonk, N.Y.

[21] Appl. No.: 736,452

[22] Filed: Oct. 24, 1996

[51] Int. Cl.[6] .................................................. G06F 12/00
[52] U.S. Cl. ........................ 711/170; 395/401; 395/427; 364/478.02
[58] Field of Search .................... 395/427, 438, 395/439, 441, 401, 481, 497.01; 364/478.02; 369/30, 34

[56] References Cited

U.S. PATENT DOCUMENTS

| | | | |
|---|---|---|---|
| 4,310,883 | 1/1982 | Clifton et al. | 395/621 |
| 5,129,088 | 7/1992 | Auslander et al. | 395/401 |
| 5,164,909 | 11/1992 | Leonhardt et al. | 364/478.03 |
| 5,164,915 | 11/1992 | Blyth | 360/69 |
| 5,303,214 | 4/1994 | Kulakowski et al. | 369/34 |
| 5,323,327 | 6/1994 | Carmichael et al. | 364/478.03 |
| 5,347,651 | 9/1994 | Burke et al. | 395/621 |
| 5,388,260 | 2/1995 | Monahan et al. | 395/401 |
| 5,416,914 | 5/1995 | Korngiebel et al. | 395/441 |
| 5,426,284 | 6/1995 | Doyle | 395/228 |
| 5,455,926 | 10/1995 | Keele et al. | 395/404 |
| 5,613,154 | 3/1997 | Burke et al. | 395/821 |
| 5,664,146 | 9/1997 | Bolin et al. | 711/115 |

OTHER PUBLICATIONS

J. A. Schlumpberger, "DL/1 Subset File Organization & Access Technique", Mar., 1980, IBM Tech. Discl. Bulletin, vol. 22, No. 10, pp. 4702-4708.

*Primary Examiner*—Paul V. Kulik
*Attorney, Agent, or Firm*—R. M. Sullivan; D. A. Shifrin

[57] ABSTRACT

When an automated data storage library includes the capability of storing and accessing more than one media type, it is necessary for the library manager to keep track of what media type is associated with each volume serial number ("VOLSER"), and where each is physically located in the library. For efficiency, VOLSERs will be grouped in sequential ranges, each range associated with a single media type (although a particular media type can be associated with different, non-contiguous ranges). When the number of VOLSERs and ranges is small, new ranges can be easily added, and existing ranges can be easily deleted or modified, manually by a system administrator. However, when the number of VOLSERs and ranges becomes large, it becomes burdensome for the administrator to track the VOLSER ranges and media types. An automated VOLSER range management system is provided which detects whether a new or modified range overlaps or is adjacent to an existing range with the same media type. If so, the system automatically combines the ranges.

5 Claims, 4 Drawing Sheets

AUTOMATED VOLSER RANGE MANAGEMENT FOR REMOVABLE MEDIA STORAGE LIBRARY

TECHNICAL FIELD OF THE INVENTION

The present invention relates to automated storage and retrieval systems, and in particular, to a method and apparatus for automatically managing media type and VOLSER range information in such a system.

BACKGROUND OF THE INVENTION

In an automated information storage and retrieval system, also known as a data storage library, numerous cells arrayed within the library are used to hold information media, such as magnetic tape cartridges or optical disks. (The term "cartridge" used herein refers to any retaining structure for information media. Although the present invention is described herein with respect to a library storing magnetic tape cartridges, it is not so limited but is equally applicable, for example, to an optical library holding optical disk cartridges, cartridge-less optical disks, optical tape cartridges and the like.) An accessor, furnished with a holding or gripping device and under the direction of a library controller, transports a selected cartridge between the cartridge's cell and a drive unit. The library controller is interconnected with a host device, such as a mainframe computer, which issues control signals related to reading/writing data from/to selected cartridges.

Library units also typically include an input/output station or port through which a system operator can pass cartridges to be added to the array and through which the accessor can pass cartridges out to the operator for removal.

Some libraries now have the capability of accommodating more than one kind of media drive and their respective media cartridges. For example, a customer may own an IBM 3494 Tape Library Dataserver with IBM 3490E tape drives. In order to take advantage of new technology without losing the investment in existing drives and cartridges, the customer can also install IBM 3590 tape drives and cartridges in the same library. Although 3590 cartridges are the same size and shape as 3490E cartridges, there are some physical differences between the two and the tape formats are different; consequently, the two cartridges and drives are incompatible. Consequently, it will be appreciated that the library controller must "know" the identity (volume serial number or "VOLSER") of each cartridge, its media type (for example, 3490E or 3590) and its location within the array of cells in order that a selected cartridge be retrieved and transported to an appropriate tape drive. Such information must be updated whenever cartridges are added to, or removed from, the library. Moreover, the need for VOLSER ranges becomes imperative when a physical library is logically segregated into two or more logical libraries, such as when a virtual tape server (VTS) coexists with non-VTS drives in a single physical library. In such a situation, the single physical library appears as two or more libraries to a host computer. Within the single physical library, a set of volumes is associated with the VTS library and another set of volumes is associated with the non-VTS library. When a volume is inserted into the library, the VOLSER ranges are used to determine the media type as well as the logical library with which to associate the volume.

SUMMARY OF THE INVENTION

In view of the foregoing, it is an object of the present invention to provide an automated system for maintaining a table indicating the media type for each VOLSER range and, in one embodiment, as part of the media type, for indicating the logical library with which to associate a VOLSER.

This object and others are achieved in this invention by providing an automated VOLSER range management system. In a described embodiment, the system administrator provides information to the library manager through a set of on-screen data entry fields. The library manager determines whether a new or modified range overlaps or is adjacent to an existing range with the same media type. If so, the system automatically combines the ranges. Additionally, the system rejects any action which would overlap a new VOLSER with an existing range of a dissimilar media type.

The foregoing and other features and advantages of the invention will be apparent from the following more particular description of preferred embodiments of the invention, as illustrated in the accompanying drawings.

DETAILED DESCRIPTION OF THE INVENTION

Figure 1:
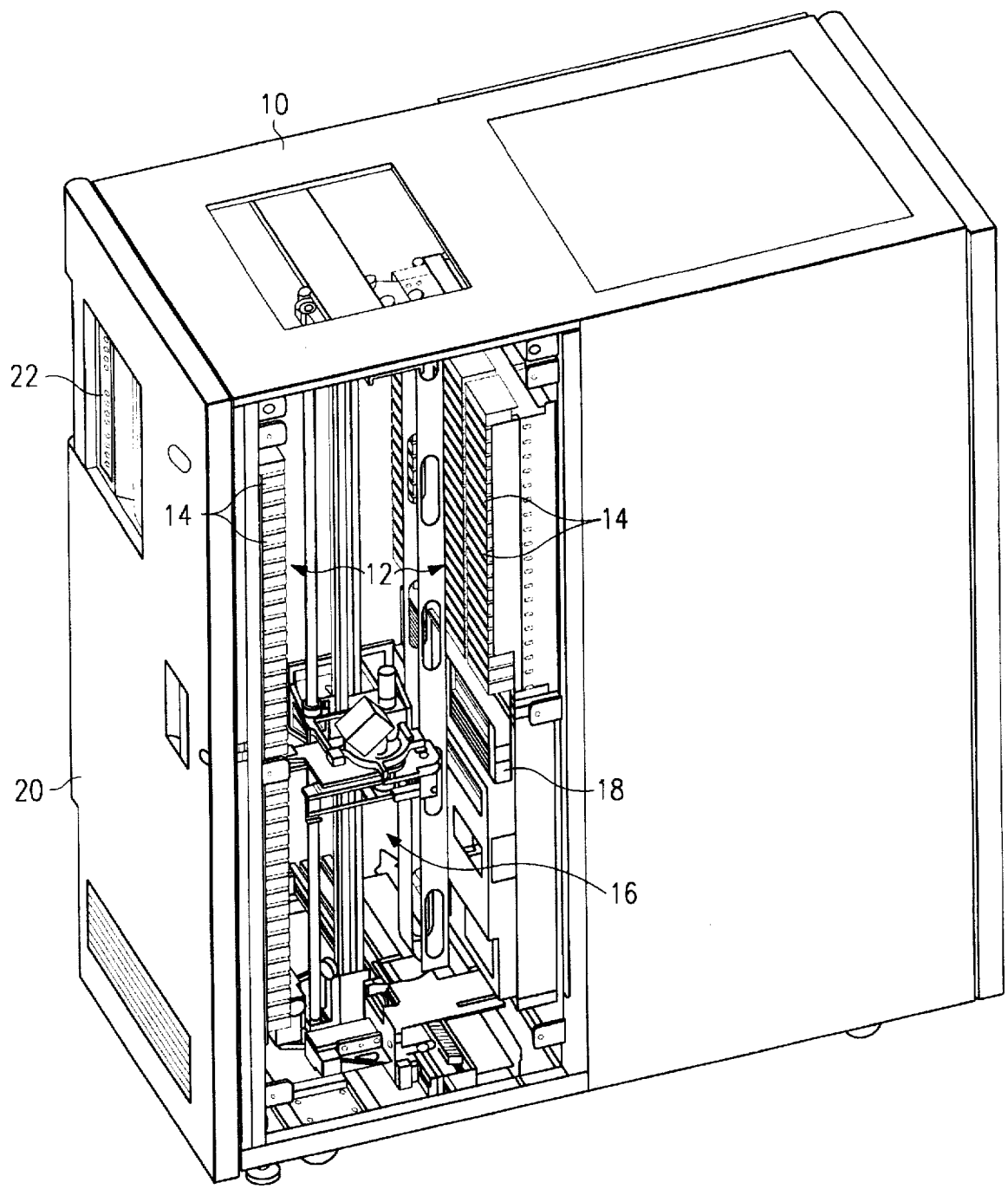
FIG. 1 is a front and right side view of an automated data storage library with a side panel removed.
Figure 2:
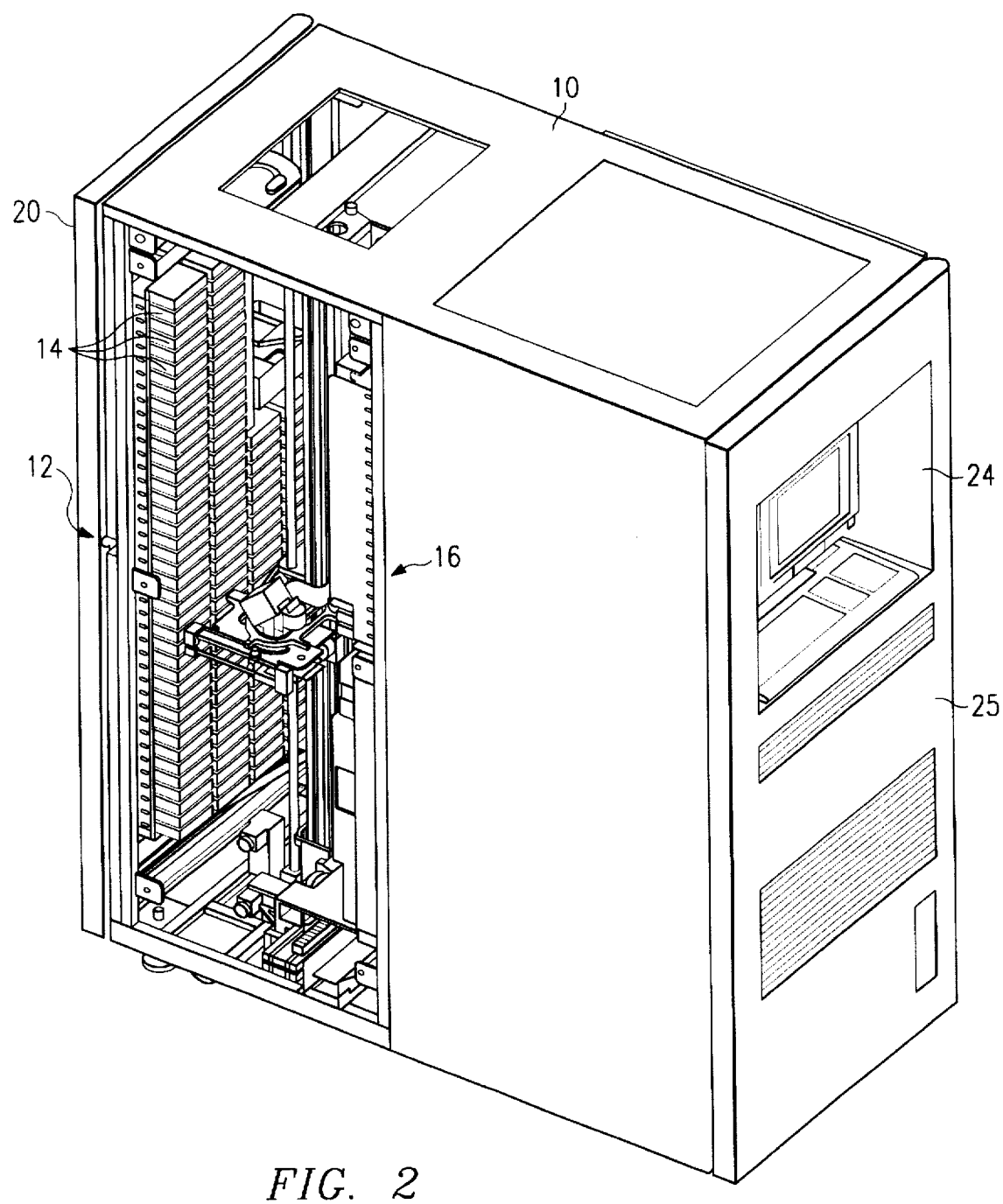
FIG. 2 is a back and right side view of the library of FIG. 1.

FIGS. 1 and 2 illustrate an automated storage and retrieval system (library) 10 for removable media cartridges (such as magnetic tape or optical disks) with side panels removed to show the interior of the library 10. The library 10 includes an array of storage slots or cells 12 arranged in columns on two of the interior walls for holding media cartridges 14. An accessor 16 includes a gripper for transporting one of the cartridges 14 between its cell 12 and a tape drive unit 18 (of which there can be more than one). The accessor 16 is capable of motion in the X, Y and Z axes and the gripper is capable of pivoting to remove and return cartridges 14 from and to the cells 12 on both walls.

A lockable front door 20 on the library 10 permits manual loading and unloading of cartridges 14 into and from the cells 12 (such as during the installation of a new library) as well as for providing maintenance access for the accessor 16, the drive 18 or other interior components. The front door 20 of the illustrated library 10 also includes an input/output station 22 through which the accessor 16 can accept cartridges from the operator for entry into the library 10, and return cartridges for removal, without the operator having to open the door 20. The I/O station 22 has storage cells to accommodate, for example, up to ten incoming or outgoing cartridges at a time. A terminal 24 is included in the back of the library 10 to allow the library operator to communicate with a library controller 25 located in the rear portion of the library 10. The library controller 25 interfaces with a host device (not shown), such as a computer, and directs the operation of the accessor 16, the drive 18 and the transmission of data between the host and the drive 18.

Figure 3:
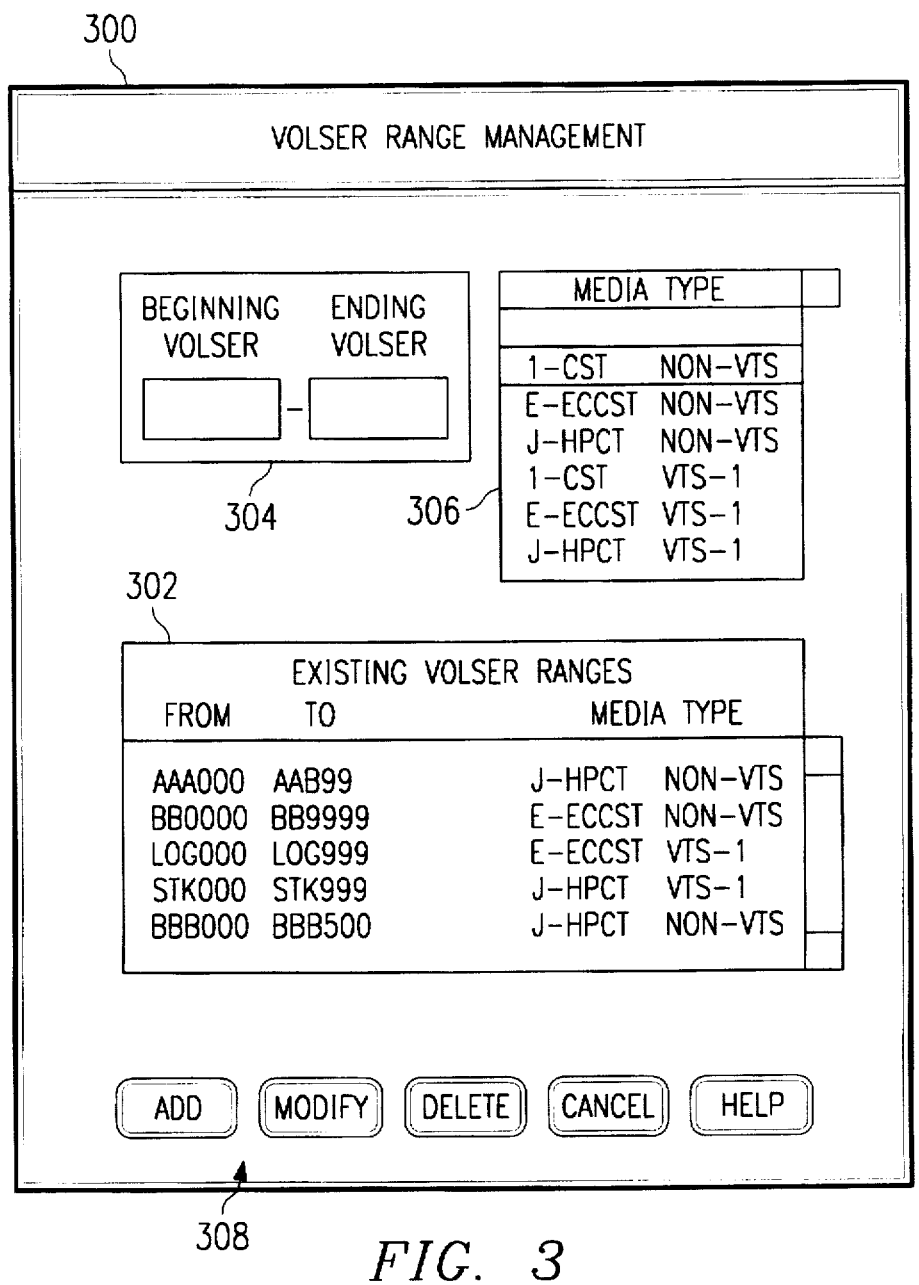
FIG. 3 illustrates an exemplary display screen which can be used with the present invention.

FIG. 3 illustrates an exemplary user interface 300 to be displayed on the terminal 24 of the library 10 which can be used by an operator to manage VOLSER ranges. A range table 302 displays current VOLSER ranges and their associated media types. An entry panel 304 opens with input fields for the beginning and ending VOLSERs and a media type panel 306 is displayed with a listing of possible media types (including logical libraries). Buttons 308 permit the operator to select the action to be taken: ADD a new range, MODIFY an existing range or DELETE an existing range. If a VOLSER range is to be deleted, the operator highlights the desired range in the range panel 302 and then selects the DELETE button, removing the range from the list in the panel 302. If a new range is to be added, the beginning and ending VOLSERs are entered in the entry panel 304 and the corresponding media type is highlighted in the type panel 306. The ADD button is then selected and the new range is added to the list in the range panel 302. If an existing range is to be modified, the range is highlighted in the range panel 302 and the new media type is highlighted in the type panel. The MODIFY button is selected and the list in the range panel 302 is updated accordingly.

Figure 4:
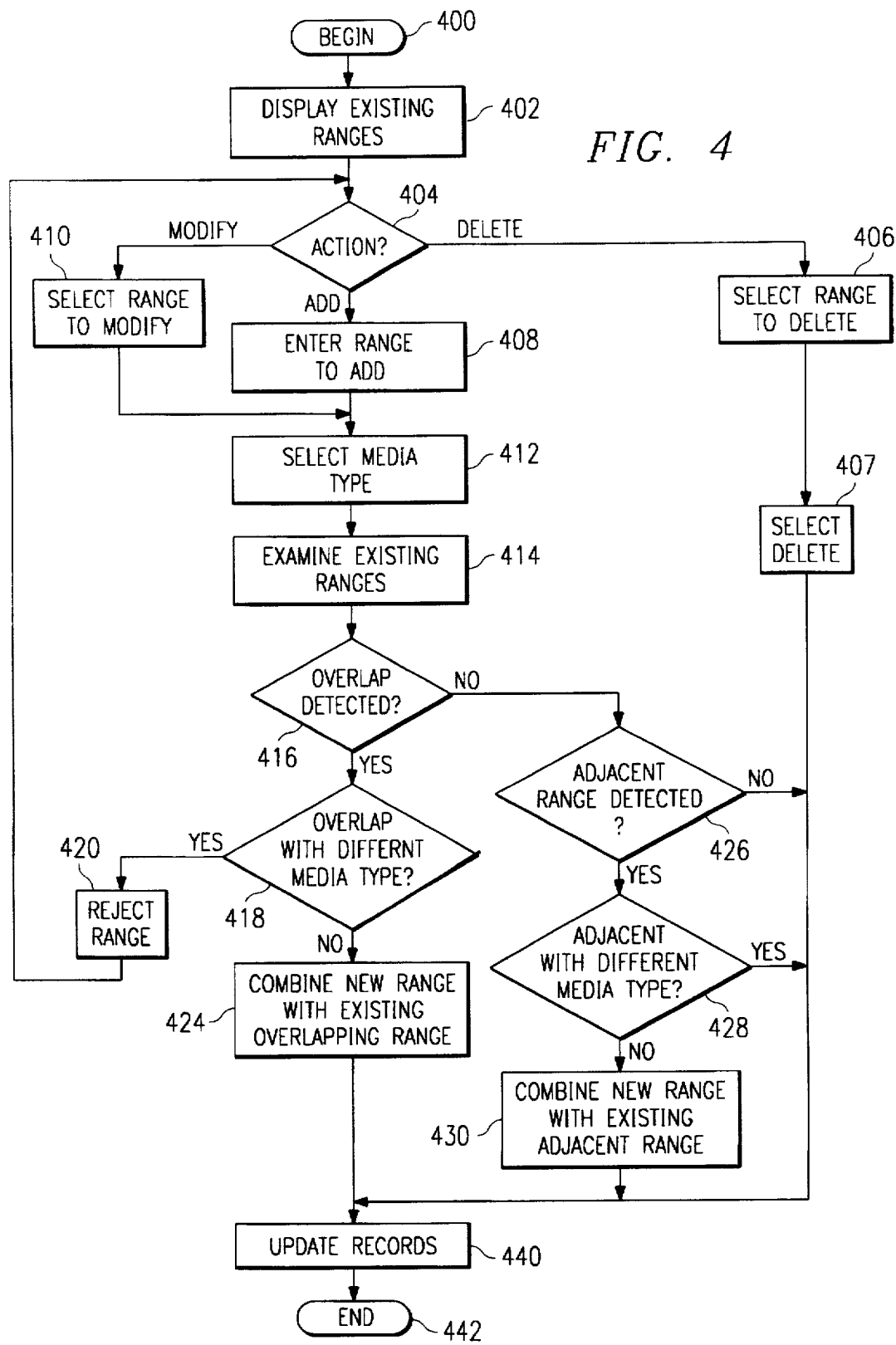
FIG. 4 is a flow chart of the VOLSER range management process of the present invention.

Referring now to FIG. 4, the VOLSER range management process of the present invention will be described. When the process is entered (Step 400), the table 302 of existing ranges is displayed (Step 402) along with the other panels illustrated in FIG. 3. If a range is to be deleted (Step 404), the range to be deleted is selected from the range panel 302 (Step 406) and the delete button selected (Step 407). The VOLSER records are then updated (Step 440) by deleting the entered range and associated media type from the range table 302 and the process ends (Step 4442).

If a new range is to be added (Step 404), the new range is entered in the entry panel 304 (Step 408). If an existing range is to be modified (Step 404), that range is highlighted in the range panel 302 (Step 410). Then, in both cases, the media type is selected from the media panel 306 (Step 412). The system examines the existing ranges (Step 414) to determine whether the range to be added or modified overlaps an existing range (Step 416). If the subject range overlaps an existing range, then a determination is made whether the media in the overlapping existing range is of a different type (Step 418). If so, the entered range is rejected as being invalid (Step 420) (by displaying, for example, a warning message on the display 24) and the operation returns to the beginning for the action to be corrected. If the media in the overlapping existing range is of the same type (Step 418), the new range is incorporated into the existing range (Step 424), the VOLSER records are updated (Step 440) by expanding the existing range to now include the non-overlapping portion of the entered range and the process ends (Step 442).

If no overlap is detected between the range to add or modify and any existing range (Step 416), then a determination is made whether the range to add or modify is adjacent to an existing VOLSER range (Step 426). If none is detected, the VOLSER records are updated (Step 440) by adding the new range and associated media type to the table, or by modifying the selected existing range, and the process ends (Step 442). If an adjacent range is detected, a determination is made whether the media in the adjacent existing range is of a different type (Step 428). If so, the VOLSER records are updated (Step 440) with the new information (by adding the range and media type to the table or by modifying the existing range or media type) and the process ends (Step 442). Otherwise, the new range is incorporated into the adjacent existing range (Step 430), the VOLSER records are updated (Step 440) accordingly and the process ends (Step 442).

While the invention has been particularly shown and described with reference to preferred embodiments thereof, it will be understood by those skilled in the art that various changes in form and details may be made therein without departing from the spirit and scope of the invention.

What is claimed is:

1. A method of maintaining VOLSER and media type information in an automated storage library, comprising the steps of:

entering a VOLSER range to modify or add to a list of VOLSER ranges and associated media types;

entering a media type to be associated with the entered VOLSER range;

determining whether an existing VOLSER range overlaps or is adjacent to the entered range;

if no existing range overlaps and is adjacent to the entered VOLSER range, updating the list of VOLSER ranges and associated media types with the entered range and media type;

if an existing range overlaps or is adjacent to the entered VOLSER range, determining if the entered media type is the same as the media type associated with the overlapping or adjacent range;

if the entered media type is the same as the media type associated with the overlapping or adjacent range, combining the entered VOLSER range with the overlapping or adjacent range and updating the list of VOLSER ranges and associated media types with the combined range and associated media type;

if the entered media type is not the same as the media type associated with an adjacent range, updating the list of VOLSER ranges and associated media types with the entered range and media type; and if the entered media type is not the same as the media type associated with an overlapping range, rejecting the entered VOLSER range and media type.

2. The method of claim 1, further comprising the steps of:

entering a VOLSER range to delete from the list of VOLSER ranges and associated media types; and deleting the entered VOLSER range from the list.

3. In an automated data storage and retrieval library system having an operator terminal, a plurality of storage cells, at least one data storage drive, and a mechanical accessor for transporting data cartridges between the storage drive and the storage cells, each data cartridge having a media type and a VOLSER, the VOLSERs of the data cartridges in the library being grouped into ranges of sequential VOLSERs, all of the VOLSERs in a particular range having the same media type, the improvement comprising:

a library controller;

a memory interconnected with said library controller;

a VOLSER range table stored in said memory and comprising a listing of each VOLSER range and its associated media type;

said library controller including a CPU for executing the steps of:

displaying a list of current VOLSER ranges and associated media types;

receiving an action command to delete a current range, add a new range or modify a current range;

if the action command is to delete a current range:
   receiving a first range to delete, the first range having a first associated media type; and
   deleting the first range from the list;

if the action command is to add a new range:
   receiving a second range to add;
   receiving a second media type to associate with the second range;

determining whether an existing range overlaps the second range;

if an existing range overlaps the second range, determining whether the second media type is different from the media type associated with the existing overlapping range;

if the second media type is the same as the media type associated with the existing overlapping range, incorporating the range to be added into the existing overlapping range; and if the second media type is different from the media type associated with the existing overlapping range, rejecting the second range and the second media type;

if an existing range does not overlap the second range, determining whether an existing range is adjacent to the second range;

if an existing range is adjacent to the second range, determining whether the second media type is different from the media type associated with the existing adjacent range;

if the second media type is the same as the media type associated with the existing adjacent range, incorporating the second range into the existing adjacent range; and updating the list of VOLSER ranges and associated media types; and if the action command is to modify an existing range: receiving a third range to modify;

receiving a third media type to associate with the third range;

determining whether another existing range overlaps the third range;

if another existing range overlaps the third range, determining whether the third media type is different from the media type associated with the other existing overlapping range;

if the third media type is the same as the media type associated with the other existing overlapping range, incorporating the third range into the other existing overlapping range; and if the third media type is different from the media type associated with the other existing overlapping range, rejecting the third range and the third media type;

if an existing range does not overlap the third range, determining whether another existing range is adjacent to the third range;

if another existing range is adjacent to the third range, determining whether the third media type is different from the media type associated with the other existing adjacent range;

if the third media type is the same as the media type associated with the other existing adjacent range, incorporating the third range into the other existing adjacent range; and updating the list of VOLSER ranges and associated media types.

4. A method of maintaining VOLSER and media type information in an automated storage library, comprising the steps of:

displaying a list of current VOLSER ranges and associated media types;

receiving an action command to delete a current range, add a new range or modify a current range;

if the action command is to delete a current range: receiving a first range to delete, the first range having a first associated media type; and deleting the first range from the list;

if the action command is to add a new range:
receiving a second range to add;
receiving a second media type to associate with the second range;
determining whether an existing range overlaps the second range;

if an existing range overlaps the second range, determining whether the second media type is different from the media type associated with the existing overlapping range;

if the second media type is the same as the media type associated with the existing overlapping range, incorporating the range to be added into the existing overlapping range; and if the second media type is different from the media type associated with the existing overlapping range, rejecting the second range and the second media type;

if an existing range does not overlap the second range, determining whether an existing range is adjacent to the second range;

if an existing range is adjacent to the second range, determining whether the second media type is different from the media type associated with the existing adjacent range;

if the second media type is the same as the media type associated with the existing adjacent range, incorporating the second range into the existing adjacent range; and updating the list of VOLSER ranges and associated media types; and if the action command is to modify an existing range:
receiving a third range to modify;
receiving a third media type to associate with the third range;
determining whether another existing range overlaps the third range;

if another existing range overlaps the third range, determining whether the third media type is different from the media type associated with the other existing overlapping range;

if the third media type is the same as the media type associated with the other existing overlapping range, incorporating the third range into the other existing overlapping range; and if the third media type is different from the media type associated with the other existing overlapping range, rejecting the third range and the third media type;

if an existing range does not overlap the third range, determining whether another existing range is adjacent to the third range;

if another existing range is adjacent to the third range, determining whether the third media type is different from the media type associated with the other existing adjacent range;

if the third media type is the same as the media type associated with the other existing adjacent range, incorporating the third range into the other existing adjacent range; and updating the list of VOLSER ranges and associated media types.

5. A program storage medium, readable by a computer, tangibly embodying a program of instruction steps executable by the computer to maintain VOLSER and media type information in an automated storage library, the program comprising the instruction steps of:

displaying a list of current VOLSER ranges and associated media types;
receiving an action command to delete a current range, add a new range or modify a current range;
if the action command is to delete a current range:
receiving a first range to delete, the first range having a first associated media type; and
deleting the first range from the list;
if the action command is to add a new range:
receiving a second range to add;
receiving a second media type to associate with the second range;
determining whether an existing range overlaps the second range;
if an existing range overlaps the second range, determining whether the second media type is different from the media type associated with the existing overlapping range;
if the second media type is the same as the media type associated with the existing overlapping range, incorporating the range to be added into the existing overlapping range; and
if the second media type is different from the media type associated with the existing overlapping range, rejecting the second range and the second media type;
if an existing range does not overlap the second range, determining whether an existing range is adjacent to the second range;
if an existing range is adjacent to the second range, determining whether the second media type is different from the media type associated with the existing adjacent range;
if the second media type is the same as the media type associated with the existing adjacent range, incorporating the second range into the existing adjacent range; and
updating the list of VOLSER ranges and associated media types; and
if the action command is to modify an existing range:
receiving a third range to modify;
receiving a third media type to associate with the third range;
determining whether another existing range overlaps the third range;
if another existing range overlaps the third range, determining whether the third media type is different from the media type associated with the other existing overlapping range;
if the third media type is the same as the media type associated with the other existing overlapping range, incorporating the third range into the other existing overlapping range; and
if the third media type is different from the media type associated with the other existing overlapping range, rejecting the third range and the third media type;
if an existing range does not overlap the third range, determining whether another existing range is adjacent to the third range;
if another existing range is adjacent to the third range, determining whether the third media type is different from the media type associated with the other existing adjacent range;
if the third media type is the same as the media type associated with the other existing adjacent range, incorporating the third range into the other existing adjacent range; and
updating the list of VOLSER ranges and associated media types.

* * * * *